United States Patent [19]

Anthony et al.

[11] Patent Number: 4,660,889
[45] Date of Patent: Apr. 28, 1987

[54] HARNESS WEB ADJUSTER WITH CHILD RESTRAINT SEAT

[75] Inventors: James R. Anthony; Allan R. Lortz, both of Carmel, Ind.

[73] Assignee: Indiana Mills & Manufacturing, Inc., Carmel, Ind.

[21] Appl. No.: 810,340

[22] Filed: Dec. 17, 1985

[51] Int. Cl.⁴ .................. A47D 15/00; B60R 21/00
[52] U.S. Cl. ............................. 297/467; 24/68 CD
[58] Field of Search .............. 297/467, 484, 468, 250; 108/55.3, 55.1; 248/499; 24/68 CD, 68 ST, 70 ST, 461, 489, 498, DIG. 22

[56] References Cited

U.S. PATENT DOCUMENTS

| 2,442,266 | 5/1948 | Davis | 24/68 CD |
| 2,919,946 | 1/1960 | Miener | 248/499 X |
| 3,380,776 | 4/1968 | Dillender | 297/467 |
| 3,678,542 | 6/1972 | Prete, Jr. | 24/70 R |
| 3,887,966 | 6/1975 | Gley | 24/68 CD |
| 4,118,833 | 10/1978 | Knox et al. | 248/499 X |

FOREIGN PATENT DOCUMENTS 2059321  5/1971  Fed. Rep. of Germany ... 24/68 CD

Primary Examiner—James T. McCall
Attorney, Agent, or Firm—Woodard, Weikart, Emhardt & Naughton

[57] ABSTRACT

A child restraining seat having a harness with an adjuster for controlling harness sizing. In the preferred embodiment, the harness includes a pair of belts fixedly secured to a pad having a downwardly extending tongue lockingly received by a belt buckle secured to the seat between the legs of the child. The opposite ends of the belts extend slidably through the seat back being attached to a moveable bar. A third belt attached to the moveable bar extends forwardly through a slot in the forward portion of the seat and is adjustably received by an adjuster mounted to the front of the seat. The adjuster includes a spring biased cam bar for lockingly holding the third belt in place. Alternate embodiments include such a harness assembly having the buckle fixedly secured thereto with a tongue secured to the seat. A further embodiment includes a harness assembly with a pair of belts slidably received through a pair of tongues with the belt then extending slidably through the seat arms being fixedly attached to the seat frame. The tongues are lockingly received by a buckle secured to the seat.

15 Claims, 8 Drawing Figures

HARNESS WEB ADJUSTER WITH CHILD RESTRAINT SEAT

BACKGROUND OF THE INVENTION

This invention is in the field of adjusters for controlling tension in a belt or web mounted to a child restraint seat.

DESCRIPTION OF THE PRIOR ART

It is known to provide a child seat for mounting atop an automobile seat with the child seat having a harness for securing a child therein, such as shown in U.S. Pat. Nos. 4,025,111 and 4,342,483. Such a child seat typically includes a harness having a pair of belts slidably mounted to the back of the seat which extend over the chest of the child with the belts having bottom ends removably locked by means of a seat belt buckle and tongue combination secured to the front lower portion of the seat. The opposite ends of the belts extend rearwardly of the seat and are attached to a moveable bar in turn having a forwardly projecting belt with an opposite end affixed to the seat. In our co-pending commonly owned U.S. patent application Ser. No. 769,061, filed Aug. 26, 1985 and entitled Belt Retractor With Tongue/Buckle Controlled Locking Cam, we disclose such a child seat with the forwardly projecting belt attached to the moveable bar being wrappingly mounted to a retractor spool mounted beneath and to the seat and activated by the relative motion between the buckle and tongue. We have disclosed herein a child seat having the previously described harness without the retractor. Instead, our new design discloses a belt or web adjuster mounted to the forward portion of the seat with the adjuster operably engaged with the forward end portion of the belt attached to the moveable bar. Such a web adjuster is shown in the commonly owned co-pending U.S. design patent application entitled Web Adjuster of inventors Allan R. Lortz and Jerry D. Bougher. We are aware of a prior web adjuster shown in U.S. Pat. No. 3,872,550 entitled Safety Belt Webbing Adjuster which discloses a pivotally mounted cam for releasably holding a belt. Operation of the adjuster allows for proper tensioning of the harness. We have also disclosed herein an alternate embodiment of the harness assembly wherein the ends of the belts are slidably mounted to a split tongue and then secured to the seat frame. The split tongue is removably and lockingly received by a buckle mounted to the seat.

SUMMARY OF THE INVENTION

One embodiment of the present invention is a device for adjusting a belt comprising a frame including a wall with a slot and a pair of upstanding brackets secured thereto, a bar mounted to and extending between the brackets and having a flat surface defining an area of contact, a belt extending along the wall and then against the bar at the area of contact and around the bar through an maximum angle of one hundred and eighty degrees with the belt then extending through the slot and away from the frame, a mounting pin mounted to and extending between the brackets and being spaced from the wall, a cam member having a pivot axis and being pivotally mounted by the pin to the frame and including an outwardly projecting rigid handle and an inwardly projecting belt engaging rough surface, and a helical spring extending spiraling around the pin and located between the pin and the cam member, the spring including one end engaged with the pin and an opposite end engaged with the cam member normally urging the cam member to pivot moving the rough surface against the belt holding the belt against the area of contact and immovable between the rough surface and the bar but being yieldable allowing the handle to be pivoted moving the rough surface away from the bar to allow the belt to be moved.

Another embodiment of the present invention is a child restraining device for mounting in a vehicle comprising a child seat having a seat support upon which the child may sit and back support against which the child may rest against, a harness movably mounted to the child seat and including a front restraining portion positionable in front of the child with a first lock means mounted on the front restraining portion, the harness including a belt affixed thereto being located beneath the seat support with the belt extending forwardly through the seat to and in front of the seat support, a second lock means mounted to the seat in front of the seat support and engageable with the first lock means to removably secure the harness to the seat, and a belt adjustor mounted to the seat in front of the seat support with the adjustor including adjusting means frictionally receiving the belt being operable to hold the belt once the belt is pulled manually through the adjustor to tighten the harness and also being operable to release the belt to loosen the harness upon manual operation of the adjustor.

It is an object of the present invention to provide a new and improved child seat harness assembly.

Yet another object of the present invention is to provide a new and improved web adjuster.

In addition, it is an object of the present invention to provide a child seat harness assembly having improved means for controlling tensioning of the harness.

Related objects and advantages of the present invention will be apparent from the following description.

DESCRIPTION OF THE PREFERRED EMBODIMENTS

Figure 1:
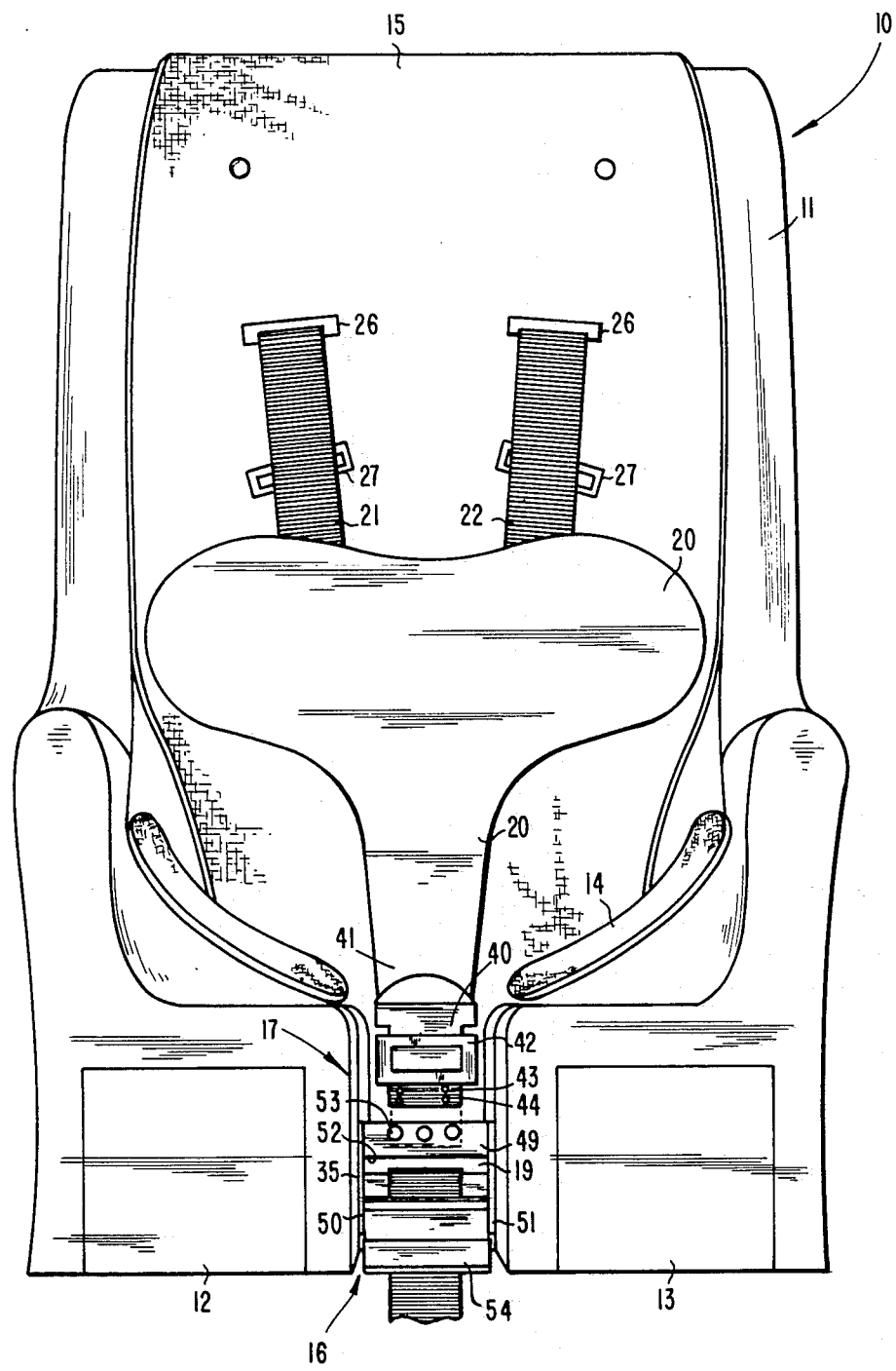
FIG. 1 is a front view of the preferred embodiment of a child seat incorporating the new and improved web adjuster disclosed herein.

For the purposes of promoting an understanding of the principles of the invention, reference will now be made to the embodiments illustrated in the drawings and specific language will be used to describe the same.

It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
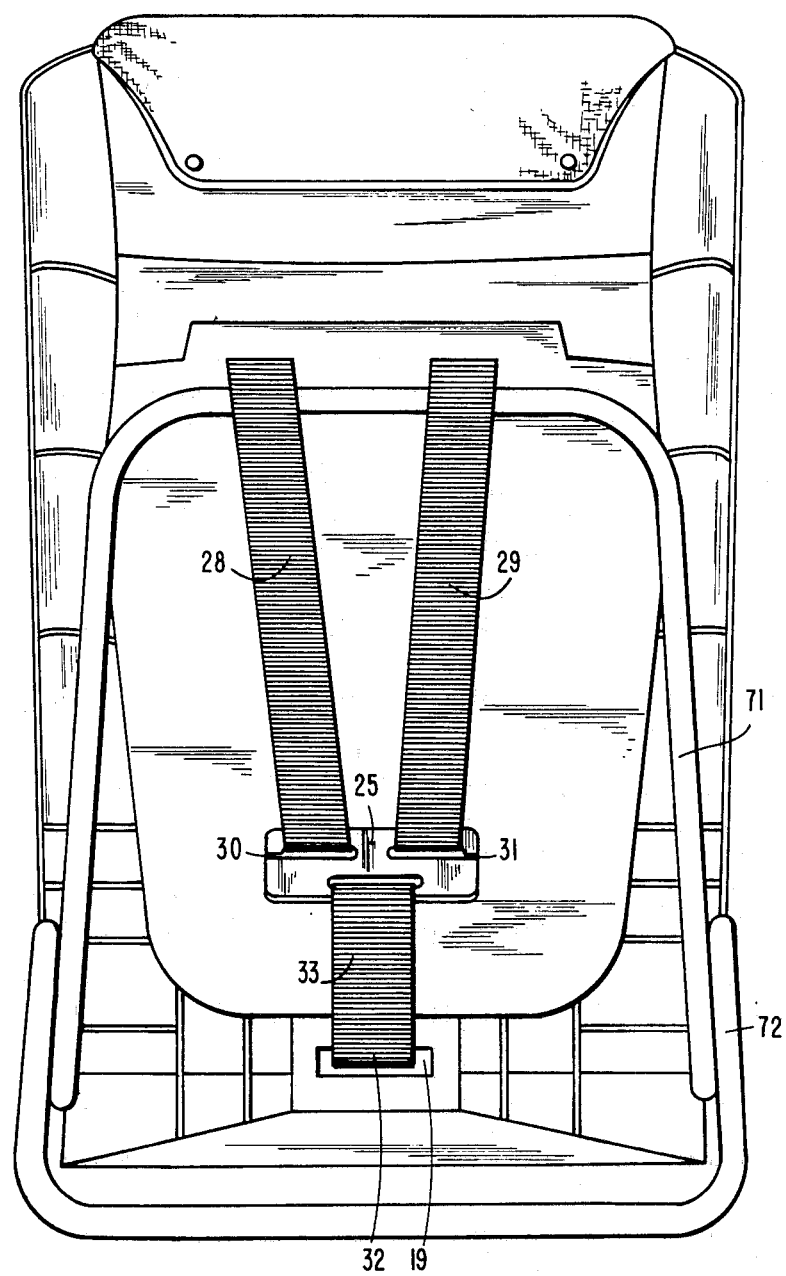
FIG. 2 is a rear view of the seat of FIG. 1.

Referring now more particularly to FIG. 1, there is shown a child's infant seat 10 for placing atop an automobile seat. Seat 10 includes a plastic main body 11 molded to receive a child in a sitting position. The seat portion 14 is generally concave in configuration and integrally joined to the back portion 15 both of which have positioned thereagainst a flexible and washable cushion. A groove 16 is provided in the front center portion of the seat with either front side 12 and 13 projecting forwardly thereof and against which the child's legs are positioned. Positioned within groove 16 is the buckle/tongue and adjuster combination 17 for adjusting the harness assembly mounted to the seat. The harness assembly includes a pair of flexible belts or straps 21 and 22 having first ends fixedly secured to pad 20 which is positioned adjacent the front of the child. Belts 21 and 22 extend through either a pair of top slots 26 or bottom slots 27 to the back of the seat and are then secured to a moveable bar 25 (FIG. 2). Bar 25 is rigid, being made of metal and includes a pair of slots 30 and 31, each of which has a outwardly opening channel to allow the bottom end portions 28 and 29 of the belts to be moved through the channel and mounted via slots 30 and 31 to the bar. Each bottom portion 28 and 29 includes a loop constructed end to allow the belts to be disengaged from bar 25 in case the belts are to be withdrawn from slots 26 and extended through slots 27. The top slots 26 are utilized in the event the child is tall whereas the belts are extended through the bottom slots 27 for a shorter child. A moveable bar for such a purpose is disclosed in U.S. design patent application Ser. No. 768,732, filed Aug. 23, 1985. Fixedly secured to bar 25 between the belts is a third belt 32 having one end 33 affixed to the bar with the opposite end extending through slot 19 formed in the forward portion of the seat within groove 16. Belt 32 extends through slot 19 and is lockingly held by adjuster 35 fixedly mounted to the seat within groove 16.

Figure 7:
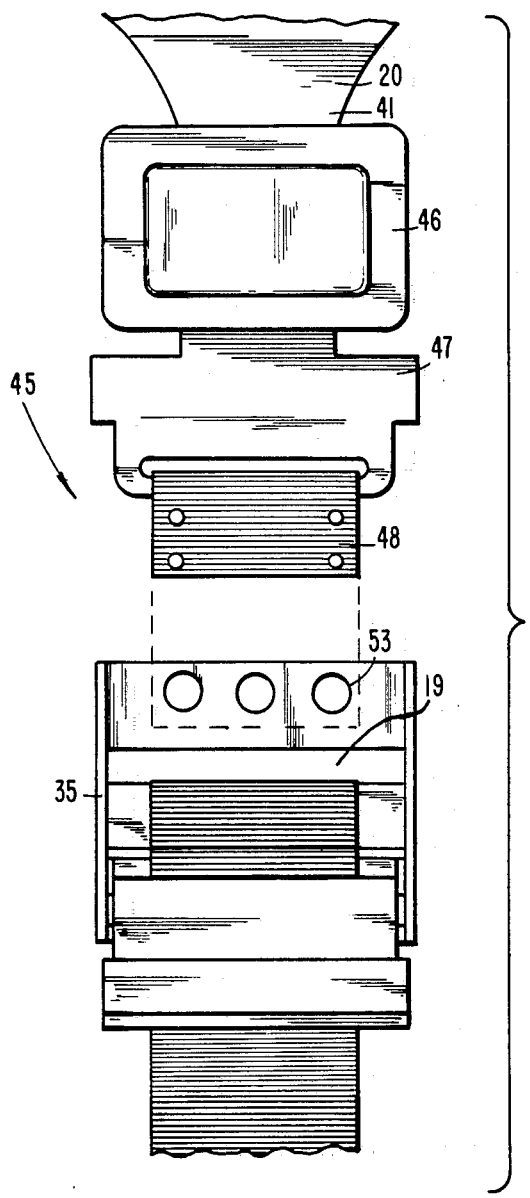
FIG. 7 is an enlarged view of an alternate embodiment of the buckle/tongue and adjuster combination shown mounted to the front of the seat of FIG. 1.

The tongue/buckle/adjuster combination 17 includes a conventional metal tongue 40 fixedly mounted to the bottom tapered end 41 of pad 20. End 41 is sized to fit between the child's legs, whereas the enlarged upper end of the pad rests against the chest and abdomen of the child. A conventional push button seat belt buckle 42 is mounted to a strap 43 in turn fixedly fastened to the seat within groove 16 by conventional fastening devices 44 such as rivets. The preferred embodiment of the invention is shown in FIG. 1. An alternate version of the FIG. 1 embodiment is identical except that the positions of the buckle and tongue are reversed as depicted in FIG. 7. Tongue/buckle/adjuster combination 45 includes a conventional push button seat belt buckle 46 fixedly secured to the bottom end 41 of pad 20 with a conventional tongue 47 secured to belt 48 in turn fastened to the seat in groove 16 by conventional fastening devices. Lower end 41 of the pad may be rigidly attached to buckle 46.

Figure 3:
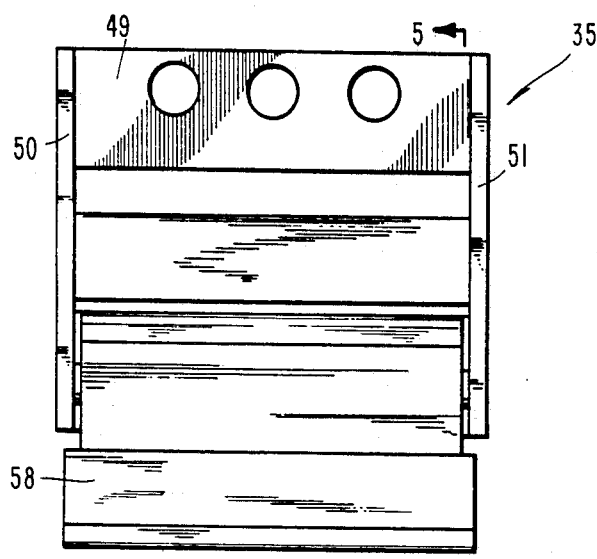
FIG. 3 is an enlarged view of the web adjuster shown mounted to the seat of FIG. 1.
Figure 4:
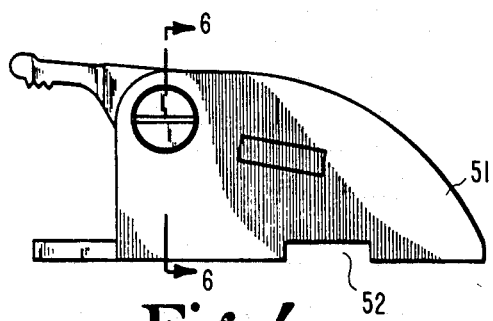
FIG. 4 is a right side view of the web adjuster of FIG. 3.
Figure 5:
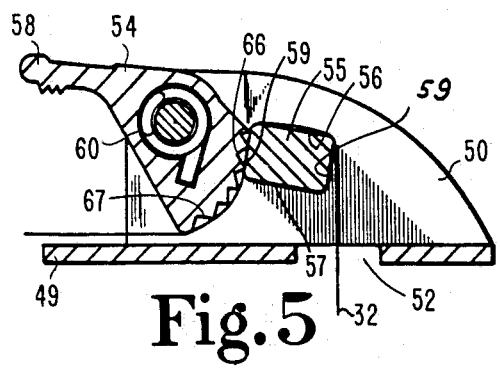
FIG. 5 is a cross-sectional view taken along the line 5—5 of FIG. 3 and viewed in the direction of the arrows.

Web adjuster 35 (FIGS. 3–5) includes a metal main body 49 integrally connected to a pair of spaced apart outwardly projecting sidewalls 50 and 51. Bottom wall 49 includes an opening 52 which is aligned with slot 19 formed in the forward portion of the seat. Bottom wall 49 is secured to the seat by conventional fastening devices. A plurality of holes 53 (FIG. 7) are provided in the upper portion of bottom wall 49 to receive conventional fastening devices to secure belt 43 or belt 48 in lieu of fastening the belt directly to the seat. Thus, belts 43 and 48 are shown as having an alternate dashed line configuration to extend downwardly to bottom wall 49.

Figure 6:
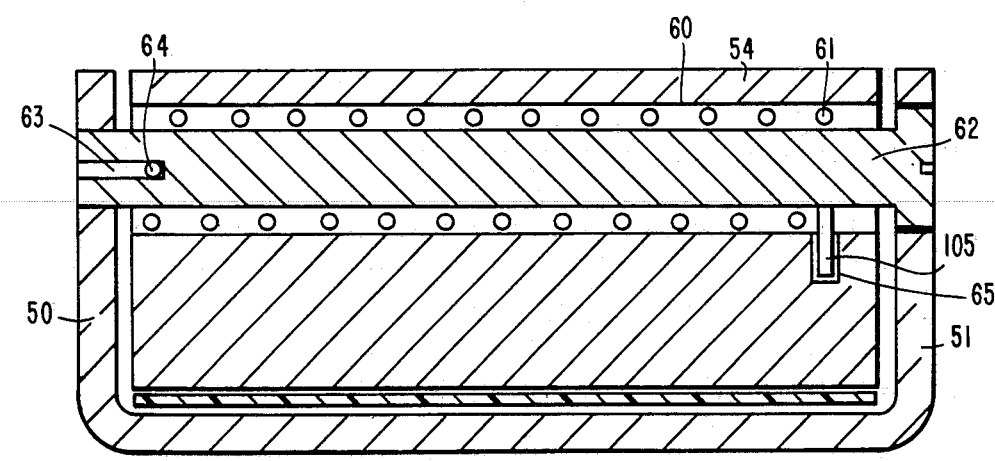
FIG. 6 is an enlarged cross-sectional view taken along the line 6—6 of FIG. 4 and viewed in the direction of the arrows.

A cam bar 54 is pivotally mounted to and between flanges 50 and 51 and is spring biased against bar 55 mounted to and between flanges 50 and 51. Bar 55 has a rectangular cross-sectional configuration with the opposite ends being reduced in size to fit into complimentary openings provided in flanges 50 and 51 preventing rotation of bar 55. The top and bottom surfaces 56 and 57 are parallel and extend upwardly toward the handled end 58 of cam bar 54 at an angle relative to the horizontal of approximately 10 degrees. The side surfaces 59 of the bar are perpendicularly arranged relative to the top and bottom surfaces 56 and 57. One of the surfaces 59 is aligned with opening 52 to allow belt 32 to extend horizontally through seat slot 19 and adjuster opening 52 until the belt engages bar 55 and extends around the top surface 56 and then downwardly between cam bar 54 and bar 55 with the cam bar forcing the belt against the other surface 59 thereby holding the belt to prevent motion between the belt and adjuster. Belt 32 then extends adjacent the bottom wall 49 of the adjuster and downwardly through groove 16 to a position beneath the seat. Thus, belt 32 extends around bar 55 through a maximum angle of 180 degrees with the belt not contacting any portion of bottom bar surface 57. The handled end 58 is arranged on the main body of cam bar 54 to extend upwardly with respect to horizontal at an approximate angle of 5 degrees when the cam bar forces the belt against bar 55. The bottom surface of handled end 58 is provided with a knurled surface to facilitate lifting and pivoting the handle in a clockwise movement as viewed in FIG. 5 to allow the belt to be adjustably moved. The cam bar includes a through hole 60 within which is positioned a helical spring 61 (FIG. 6) and a pin 62. The pin extends centrally through the helical spring and has a slot 63 at one end to receive one end 64 of the spring with the opposite end 105 of the spring extending into a hole 65 provided in the cam bar. The helical spring is installed with the opposite ends in slot 63 and hole 65 so that the plurality of ridges 66 provided on the inner end of the cam bar are forced against the belt trapping the belt between the cam bar and bar 55. The top ridges are positioned a radial distance closer to the pivot axis of the cam bar as compared to the ridges located at the bottom end 67 thereby preventing the cam bar from completely pivoting counterclockwise as viewed in FIG. 5 to move completely above bar 55. Ridges 66 are spaced apart from bottom wall 49 a sufficient distance to allow belt 32 to pass between the cam bar and the bottom wall.

Figure 8:
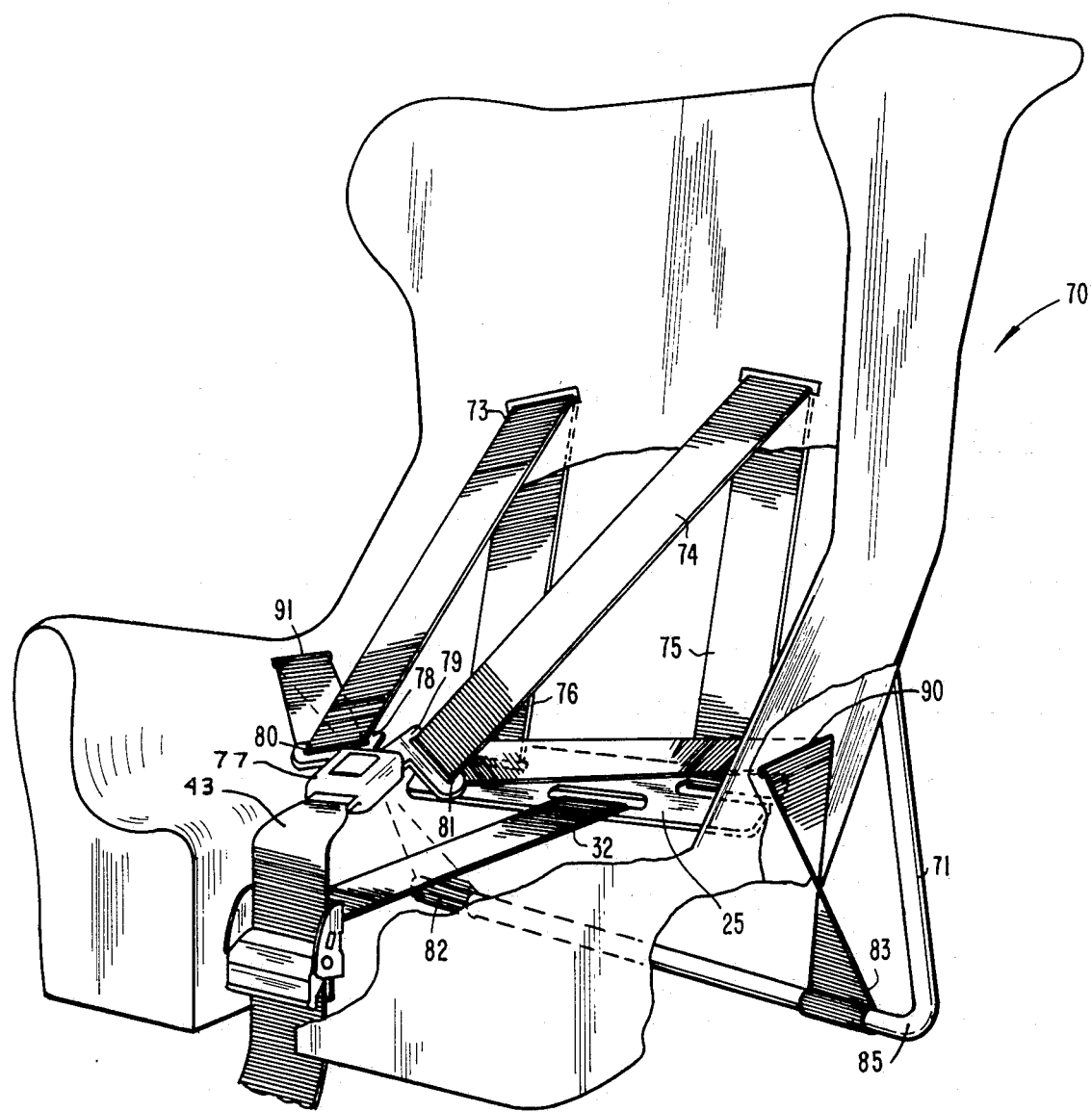
FIG. 8 is a perspective view of the seat shown in FIG. 1 only provided with an alternate embodiment of the harness assembly.

A further embodiment is shown in FIG. 8. Seat 70 is identical to seat 10 with the exception that the harness assembly is slidably attached to a split tongue and then fixedly secured to the tubular metal frame supporting the main body of the seat. Main body 11 of seat 10 (FIG. 2) is fixedly secured by conventional fasteners to a tubular frame 71 which is attached to the back 15 of the seat and extends between the back surface of the seat and belts 21 and 22. The bottom end of tubular frame 71 is fixedly secured to and beneath seat 14 by conventional fasteners. Suitable hinge or adjustment means 72 may be provided to allow the seat to be tilted at various angles. Such tubular frames are commercially known.

The harness of seat 70 includes a pair of belts 73 and 74 having bottom ends 75 and 76 with loops thereon extending into a pair of slots on bar 25 in a manner identical to that previously described for the embodiment shown in FIG. 1. The main body of the seat 70 is shown in dashed line configuration in order to more clearly illustrate the design of the harness assembly. Likewise, belt 32 of the harness is fixedly secured by a loop to bar 25 and extends forwardly through a slot in the front portion of the seat being lockingly secured by adjuster 35 in a manner identical to that previously described for the embodiment of FIG. 1. Likewise, seat belt buckle 77 is secured to a belt 43 attached either directly to the seat or fixedly to the adjuster as previously described.

Seat belt buckles are well known which receive a pair of tongues in lieu of a single tongue. Tongues 78 and 79 are each provided with a closed slot 80 and 81, respectively, which slidably receive belts 73 and 74, respectively. The forward projecting portion of each tongue 78 and 79 is lockingly received by buckle 77. The belts extend slidably through slots 80 and 81 having bottom ends 82 and 83 fixedly secured to the laterally extending bottom portion 85 of tubular frame 71. A pair of slots 90 and 91 are provided in the arms of the chair for, respectively, belts 73 and 74 to slide therethrough. The harness assembly for seat 70 is not provided with an abdominal pad 20 and instead belt 73 and 74 rest adjacent the chest and abdomen of the child. It is desirable to provide a sufficient length of belt 43 to position buckle 77 upwardly from the normal downward position shown for seat 10 in FIG. 1.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A device for adjusting a belt, comprising:
   a frame including a pair of upstanding brackets and a wall extending orthogonally between said brackets, said wall having a plane and a slot extending between said brackets;
   a bar mounted to and extending between said brackets and having a flat surface defining an area of contact, said bar being parallel to said wall;
   a belt extending along said wall, then diverging away from the plane of said wall toward said bar and then against said bar at said area of contact and around said bar through a maximum angle of one hundred and eighty degrees with said belt then extending through said slot and away from said frame;
   a mounting pin mounted to and extending between said brackets and being spaced from said wall;
   a cam member having a pivot axis and being pivotally mounted by said pin to said frame and including an outwardly projecting rigid handle and an inwardly projecting belt engaging rough surface; and,
   a helical spring extending spiraling around said pin and located between said pin and said cam member, said spring including one end engaged with said pin and an opposite end engaged with said cam member normally urging said cam member to pivotally move said rough surface against said belt holding said belt against said area of contact and immovable between said rough surface and said bar but being yieldable allowing said handle to be pivoted moving said rough surface away from said bar to allow said belt to be moved.

2. A device for adjusting a belt, comprising:
   a frame including a wall with a slot and a pair of upstanding brackets secured thereto;
   a bar mounted to and extending between said brackets and having a flat surface defining an area of contact;
   a belt extending along said wall and then against said bar at said area of contact and around said bar through an maximum angle of one hundred and eighty degrees with said belt then extending through said slot and away from said frame;
   a mounting pin mounted to and extending between said brackets and being spaced from said wall;
   a cam member having a pivot axis and being pivotally mounted by said pin to said frame and including an outwardly projecting rigid handle and an inwardly projecting belt engaging rough surface;
   a helical spring extending spiraling around said pin and located between said pin and said cam member, said spring including one end engaged with said pin and an opposite end engaged with said cam member normally urging said cam member to pivot moving said rough surface against said belt holding said belt against said area of contact and immovable between said rough surface and said bar but being yieldable allowing said handle to be pivoted moving said rough surface away from said bar to allow said belt to be moved; and,
   said bar including a rectangular cross section with four sides one of which defines said area of contact, said belt being in contact with a maximum of three of said four sides, said bar including a pair of opposite, reduced in size, ends mounted to said brackets.

3. A device for adjusting a belt, comprising:
   a frame including a wall with a slot and a pair of upstanding brackets secured thereto;
   a bar mounted to and extending between said brackets and having a flat surface defining an area of contact;
   a belt extending along said wall and then against said bar at said area of contact and around said bar through an maximum angle of one hundred and eighty degrees with said belt then extending through said slot and away from said frame;
   a mounting pin mounted to and extending between said brackets and being spaced from said wall;
   a cam member having a pivot axis and being pivotally mounted by said pin to said frame and including an outwardly projecting rigid handle and an inwardly projecting belt engaging rough surface;
   a helical spring extending spiraling around said pin and located between said pin and said cam member, said spring including one end engaged with said pin and an opposite end engaged with said cam member normally urging said cam member to pivot moving said rough surface against said belt holding said belt against said area of contact and immovable between said rough surface and said bar but being yieldable allowing said handle to be pivoted moving said rough surface away from said bar to allow said belt to be moved;

a child seat configured to receive a child and mountable upon an automobile seat;

harness means mounted to said automobile seat and extendable over the child to secure the child within said child seat, said harness means includes a first end with first fastening means thereon and a second end with said belt provided thereat, said belt extending through said frame and engaged by said bar and said cam member to allowing tightening of said harness means; and, second fastening means mounted on said frame to be lockingly engaged with but removable from said first fastening means to secure said harness means thereto.

4. The device of claim 3 wherein:
said first fastening means is a buckle and said second fastening means is a tongue insertable into said buckle.

5. The device of claim 3 wherein:
said second fastening means is a buckle and said first fastening means is a tongue insertable into said buckle.

6. The device of claim 3 wherein:
said harness means includes an abdominal pad, said belt, a rigid bar and a pair of belts, said abdominal pad is located in front of said seat with said first fastening means affixed thereto at said first end, said pair of belts are mounted to said abdominal pad and extend therefrom through the back of said seat, said rigid bar is located behind said seat and is attached to said pair of belts, said belt is attached to said rigid bar and extends forwardly through said seat and through said slot of said frame.

7. The device of claim 3 wherein:
said harness means includes a rigid bar, said belt and a pair of belts, said pair of belts have first ends fixedly fastened to said seat and then extend slidably through said first fastening means which include a pair of buckle tongues, said pair of belts extend from said tongues through the back of said seat and are attached to said rigid bar which is located behind said seat, said belt is attached to said rigid bar and extends forwardly through said seat and through said slot of said frame, said second fastening means includes a web fixedly attached to said seat and a buckle attached to said web lockingly receiving said tongues.

8. A child restraining device for mounting in a vehichle, comprising:
a child seat having a seat support upon which the child may sit and back support against which the child may rest against;

a harness movably mounted to said child seat and including a front restraining portion positionable in front of the child with first lock means mounted on said front restraining portion, said harness including a belt affixed thereto being located beneath said seat support with said belt extending forwardly through said seat to and in front of said seat support;

second lock means mounted to said seat in front of said seat support and engageable with said first lock means to removably secure said harness to said seat; and, a belt adjustor mounted to said seat in front of said seat support with said adjustor including adjusting means frictionally receiving said belt being operable to hold said belt once said belt is pulled manually through said adjustor to tighten said harness and also being operable to release said belt to loosen said harness upon manual operation of said adjustor.

9. The device of claim 8 wherein:
said adjustor includes a frame with a wall and a slot located thereon and a pair of upstanding brackets secured thereto, a bar mounted to and extending between said brackets and having a surface defining an area of contact, said belt extends along said wall and then against said bar at said area of contact and around said bar through an maximum angle of one hundred and eighty degrees with said belt then extending through said slot and away from said frame, a mounting pin mounted to and extending between said brackets and being spaced from said wall, a cam member having a pivot axis and being pivotally mounted by said pin to said frame and including an outwardly projecting rigid handle and an inwardly projecting belt engaging rough surface, a helical spring extending spiraling around said pin and located between said pin and said cam member, said spring including one end engaged with said pin and an opposite end engaged with said cam member normally urging said cam member to pivot moving said rough surface against said belt holding said belt against said area of contact and immovable between said rough surface and said bar but being yieldable allowing said handle to be pivoted moving said rough surface away from said bar to allow said belt to be moved.

10. The device of claim 9 wherein:
said bar includes a rectangular cross section with four sides one of which defines said area of contact, said belt is in contact with a maximum of three of said four sides, said bar includes a pair of opposite, reduced in size, ends mounted to said brackets.

11. A child restraining device for mounting in a vehicle, comprising:
a seat having a seat support and a back support;

harness means positionable in front of a child sitting in said seat for holding said child securely in said seat;

first locking means attached to said harness means for removably securing said harness means to said said seat;

second locking means mounted to said seat for receiving and lockingly engaging said first locking means; and, a belt adjustor mounted to said seat for tensionably adjusting the proximity of said harness means relative to said child when said first and second locking means are engaged, said belt adjustor including a manually operated cam member and bar designed to frictionally receive and hold stationary a portion of said harness means, said cam member being pivotably adjustable to bias said belt against said bar and to release said harness means.

12. The child restraining device of claim 11 wherein:
said adjustor includes a frame having a pair of upstanding, orthogonal brackets, a wall mounted to and extending orthogonally between said brackets, a slot located in said wall and extending between said brackets, a bar mounted to and extending between said brackets and being spaced from said wall and having a surface defining an area of contact, a mounting pin mounted to and extending between said brackets and being spaced from said wall, a cam member pivotally mounted by said pin to said frame and including an outwardly projecting rigid handle and an inwardly projecting belt engaging rough surface, and a helical spring surrounding said pin and pivotally biasing the rough surface of said cam member against the area of contact of said bar.

13. The child restraining device of claim 12 wherein: said portion of said harness means is a belt, said belt extending along said wall then diverging from said wall toward said bar then extending between the area of contact of said bar and the rough surface of said cam member then around said bar through a maximum angle of one hundred and eighty degrees and then through said slot and away from said frame.

14. The child restraining device of claim 13 wherein: the rough surface of said cam member defines an arcuate surface, and wherein when said rough surface is biasing said belt against said bar, the radial distance of said arcuate surface from said pin increases toward said wall.

15. The child restraining device of claim 14 wherein: said bar includes a rectangular cross section and has four sides, said belt being in contact with a maximum of three of said four sides.

* * * * *

UNITED STATES PATENT AND TRADEMARK OFFICE
CERTIFICATE OF CORRECTION

PATENT NO. : 4,660,889
DATED : April 28, 1987
INVENTOR(S) : James R. Anthony et al.

It is certified that error appears in the above-identified patent and that said Letters Patent is hereby corrected as shown below:

Column 1,
Line 59, after "through" delete "an" and substitute -- a -- in its place.

Column 6,
Line 17, after "through" delete "an" and substitute -- a -- in its place.

Column 7,
Lines 50-51, delete "vehichle," and substitute -- vehicle, -- in its place.

Column 8,
Line 14, after "through" delete "an" and substitute -- a -- in its place.
Line 47, delete "to said said" and substitute -- to said -- in its place.

Signed and Sealed this

First Day of February, 2005

JON W. DUDAS
*Director of the United States Patent and Trademark Office*